Jan. 7, 1936. A. E. SCHNEIDER 2,027,203
APPARATUS FOR FREEZING ICE CREAM AND SIMILAR MIXES
Filed April 30, 1934 3 Sheets-Sheet 1

INVENTOR
Albert E. Schneider.
BY
ATTORNEY

Jan. 7, 1936.   A. E. SCHNEIDER   2,027,203
APPARATUS FOR FREEZING ICE CREAM AND SIMILAR MIXES
Filed April 30, 1934   3 Sheets-Sheet 2
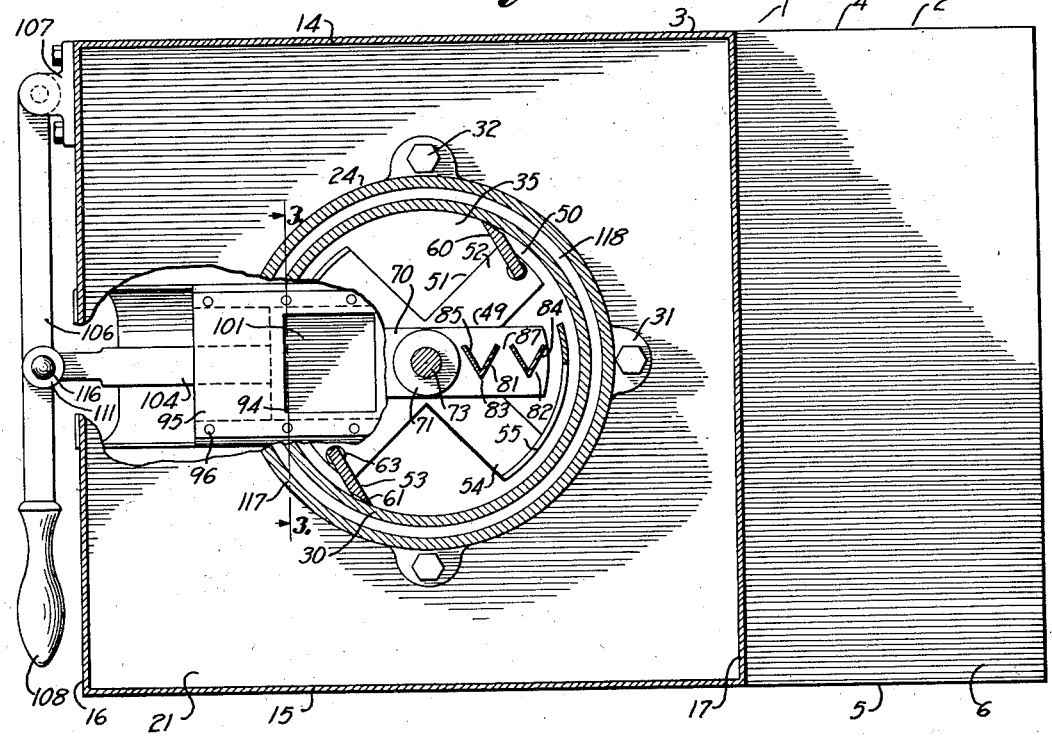
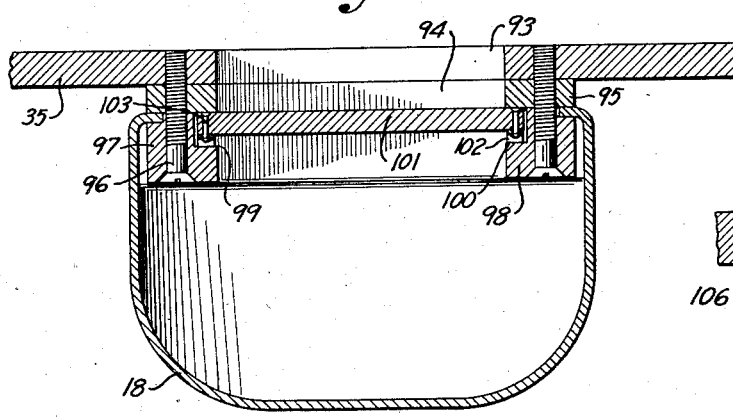
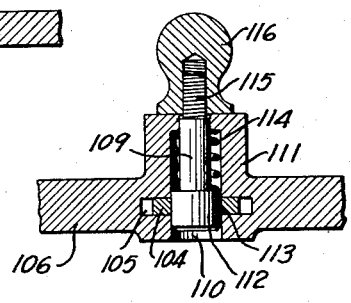
INVENTOR
Albert E. Schneider.
BY
ATTORNEY Jan. 7, 1936.    A. E. SCHNEIDER    2,027,203
APPARATUS FOR FREEZING ICE CREAM AND SIMILAR MIXES
Filed April 30, 1934    3 Sheets-Sheet 3
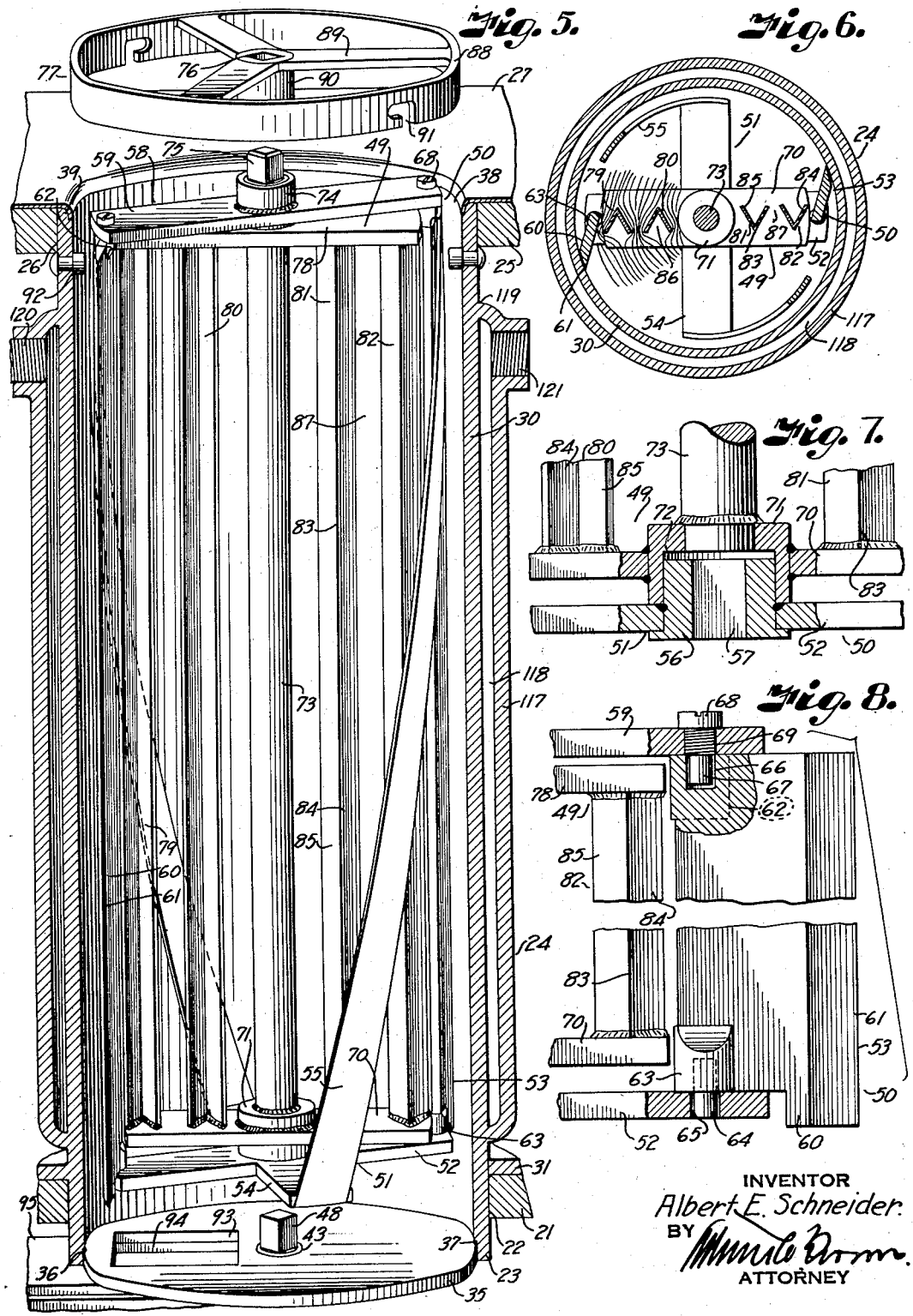
INVENTOR
Albert E. Schneider.
BY
ATTORNEY Patented Jan. 7, 1936

2,027,203

UNITED STATES PATENT OFFICE 2,027,203

APPARATUS FOR FREEZING ICE CREAM AND SIMILAR MIXES

Albert E. Schneider, Carter Lake, Iowa, assignor to Baker Ice Machine Co. Inc., Omaha, Nebr., a corporation of Nebraska Application April 30, 1934, Serial No. 723,154

4 Claims. (Cl. 259—9)

This invention relates to apparatus for freezing ice cream and similar mixes wherein it is desirable to incorporate a sufficient number of air cells during the freezing process for improving the texture and quality of the finished product. In freezing ice cream mixes it is difficult to incorporate the required number of air cells without turning of butter particles and the separation of the butter content which results in destroying the richness of flavor and the production of a frothy, foamy product.

It is, therefore, a principal object of this invention to effect incorporation of the required number of air cells completely blended into a homogeneous mass to form a fine bodied, high quality product.

Other important objects of the invention are to shorten the required freezing period, to remove the ice crystals as they are formed on the freezer wall, and to increase the efficiency of the refrigerant employed by its direct expansion in the jacket of the freezer cylinder.

In accomplishing these and other objects of the invention, I have provided improved details of structure, the preferred form of which is illustrated in the accompanying drawings, wherein:

Fig. 2 is a horizontal section through the apparatus on the line 2—2, Fig. 1, a part of the cabinet and freezer cylinder being broken away to better illustrate the discharge outlet gate and its operating mechanism for emptying the frozen product from the freezer cylinder.

Fig. 3 is an enlarged cross sectional view through the bottom of the freezer cylinder and the discharge spout on the line 3—3, Fig. 2.

Fig. 4 is a sectional view through the connection of the discharge gate with its operating lever, particularly illustrating the release pin whereby the lever may be disconnected from the gate to permit complete removal thereof for cleansing purposes.

Fig. 5 is an enlarged perspective section through the freezer cylinder, particularly illustrating the dasher construction and its mounting, the dasher being shown as lifted from its connection with the driving shaft, and the dasher centering spider being shown in spaced relation with the dasher and the freezer cylinder.

Fig. 6 is a horizontal section through the freezer cylinder and dasher on the line 6—6, Fig. 1.

Fig. 7 is an enlarged detail section of the clutch connector for connecting the dasher with the driven shaft.

Fig. 8 is an enlarged detail view of the upper and lower portions of the dasher illustrating the pivotal mounting of one of the scraper blades.

Figure 1:
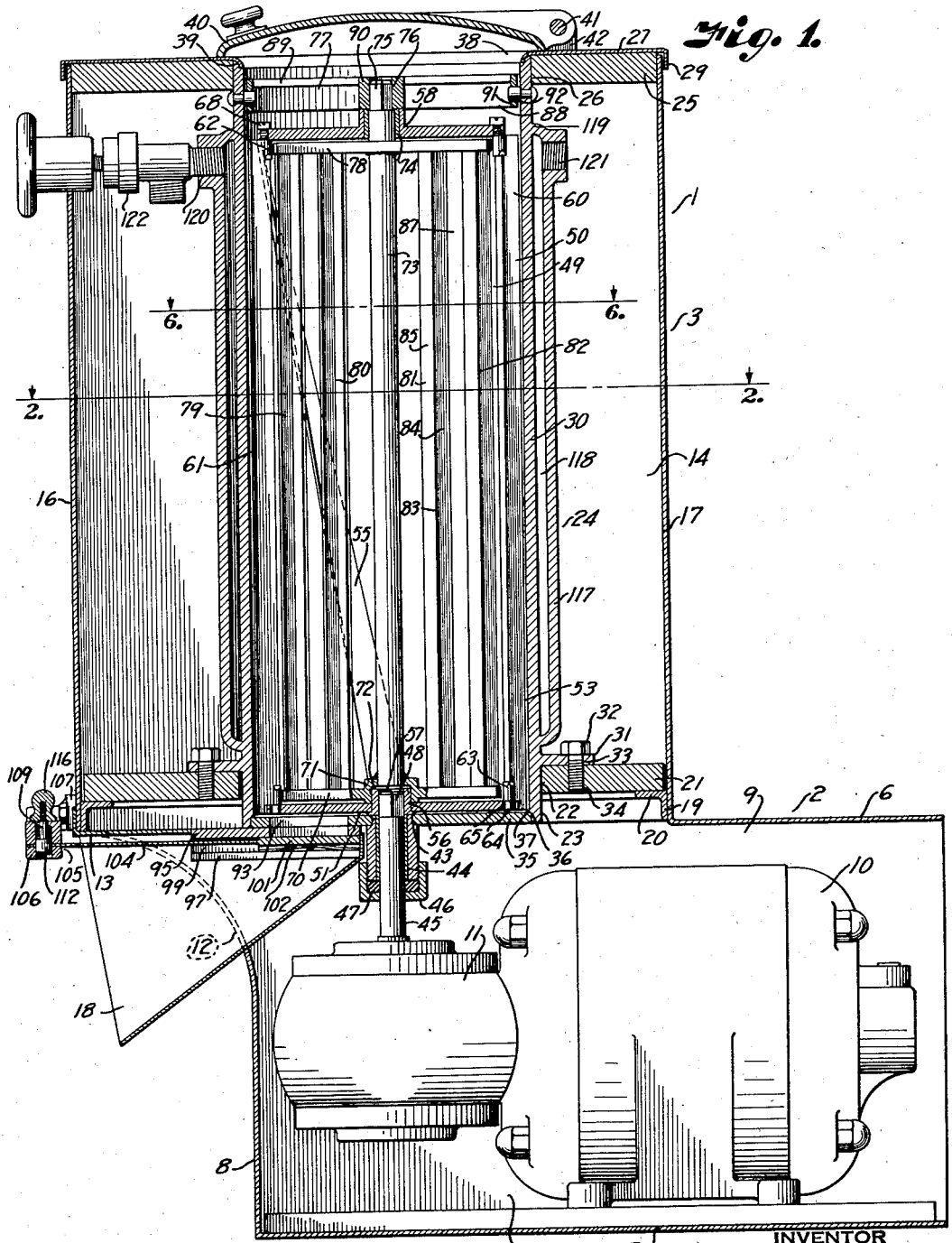
Fig. 1 is a vertical sectional view through a freezing apparatus constructed in accordance with my invention.

Referring more in details to the drawings:—

1 designates a preferably sheet metal cabinet including a base 2 and a freezer cylinder housing 3 supported thereon.

The base 2 includes side walls 4 and 5, top and bottom walls 6 and 7, and a front wall 8 to form a substantially enclosed compartment 9 to house the freezer actuating motor 10 and a directly connected transmission 11, the end of the base 2 opposite the end wall 8 being open to provide access to the motor. The upper portion of the front wall 8 curves outwardly as at 12 to connect with a forward extension 13 of the top 6 to provide an extended support for the freezer housing 3.

The freezer housing 3 preferably includes side walls 14 and 15 supported in the plane of the side walls 4 and 5 of the base, and front and back walls 16 and 17, the front wall 16 being positioned above the upper curved portion of the wall 8 so that the bottom of the freezer housing extends beyond the base 2 to accommodate a discharge spout 18 through which the frozen product is discharged from the freezer as later described.

Extending around the inner face of the vertical walls of the cabinet 3 at a point adjacent the bottom thereof is an angle member 19 having an inwardly projecting flange 20 to constitute a support for a horizontal plate 21 conforming to the shape of the cabinet.

The plate 21 is provided with a centrally located circular opening 22 in which the lower end 23 of the freezer cylinder 24 is mounted.

The top of the cabinet 2 is provided with a similar horizontally supported plate 25 having a cylindrical opening 26 aligning with the opening 22 in the plate 21 previously described for mounting the upper end of the cylinder. The plate 25 is supported by the cabinet walls in any suitable manner and is covered by a sheet metal top 27 having a depending peripheral flange 29 overlapping the upper edges of the cabinet walls as illustrated in Fig. 1.

The freezer cylinder 24 includes a cylindrical member 30 constituting the vertical wall of the freezer and has an outer diameter to fit within the openings 22 and 26 so that it is supported in true vertical position by the plates 21 and 25.

Extending laterally from the outer face of the wall 30 are spaced ears 31 engaging the upper face of the plate 21 to support the cylinder against vertical movement. The cylinder is anchored to the lower plate by cap screws 32 extending through openings 33 in the ears and into threaded openings 34 in the plate 21 as illustrated in Fig. 1. The bottom of the cylinder is enclosed by a disk 35 having its periphery seated against a shoulder 36 formed in the lower end of the cylinder and is welded thereto as at 37.

The sheet metal top 27 is provided with a central opening 38 having its edge curved downwardly to sealingly engage a rounded shoulder 39 formed in the upper end of the cylinder wall 30. The open end of the freezer cylinder is closed by a cover 40 which is preferably hinged by a pin 41 to lugs 42 projecting upwardly from the plate 25 and is provided with a knob or handle by which it may be moved to open position when the cylinder is to be charged with the material to be frozen.

Threaded into an opening 43 formed in the bottom 33 of the freezer cylinder is a tubular bearing 44 for rotatably mounting a vertical power shaft 45 of the transmission 11. The lower end of the bearing 44 is externally threaded to receive a packing gland 46 to retain a packing ring 47 in sealing engagement with the shaft to prevent leakage of the material being frozen through the bearing. The upper end of the shaft 45 extends above the bottom of the freezer cylinder and is provided with a polygonal portion 48 to provide a driving connection for the dasher now to be described.

The dasher assembly includes a stationary divider element 49 and an outer rotary dasher element 50. The rotary element includes a spider-shaped dasher head 51 having laterally projecting arms 52 for pivotally mounting scraper blades 53 and right angularly extending arms 54 for mounting spiral connector bars 55.

The spider 51 also includes a central hub portion 56 having a polygonal socket 57 conforming to the shape of the polygonal portion 48 of the driving connector whereby a driving connection is established between the shaft and the spider to actuate the scraper blades as later described. The spiral connector bars 55 extend upwardly from the ends of the arms 54 adjacent the inner wall of the cylinder to a point at the upper end thereof which is directly above the retreating edges of the spider arms 52 for supporting an upper dasher head comprising a cross bar 58 forming lateral arms 59 positioned in substantially vertical alignment with the arms 52. The upper and lower ends of the spiral connector bars are preferably welded to the outer end of the arms 54 and to the retreating edges of the arms 59 as is best illustrated in Fig. 5.

The scrapers 53 comprise flat, vertically positioned blades 60 having bevelled knife-like forward edges 61 arranged to ride in contact with the cylinder wall to scrape the ice crystals therefrom when the dasher is rotated as later described. The ends of the blades are provided with upper and lower bosses 62 and 63 preferably welded thereto adjacent the rear edges thereof as best illustrated in Fig. 8.

The lower bosses 63 carry depending trunnions 64 which are rotatably mounted in bearing openings 65 formed in the ends of both arms 52. The upper bosses are provided with sockets 66 to engage over trunnion pins 67 projecting from the ends of screws 68 that are threaded into internally threaded openings 69 formed in the outer ends of the upper arms 59 at points directly above the trunnions 64. The trunnions 64 and 67 thus form pivotal mountings for the scraper blades so that the scraper blades may be hingedly retained in scraping contact with the inner wall of the cylinder by the material which is pushed ahead of the blades.

The boss 56 on the spider 51 extends above the upper face of the arms and constitutes a cylindrical support for mounting the fixed dasher element now described.

The fixed divider element includes a lower horizontal bar 70 having a central boss 71 provided with an internal socket 72 for engaging over the upper extension of the boss 56 previously described. Welded to the upper face of the boss 71 is a vertical rod 73 extending upwardly within the axis of the cylinder and through a bearing boss 74 formed integrally with the upper arms 59 and provided at its terminal with a polygonal shaped portion 75 engaging in a polygonal shaped socket 76 provided in a fixed centering spider 77 later described.

Welded on the upper end of the shaft 73 is a horizontal bar 78 complementary to the bar 70 and extending between the horizontal bars are spaced vertical bars 79 and 80 at one side of the shaft and similar bars 81 and 82 at the opposite sides of the shaft. The bars are preferably V shaped in cross section and have their upper and lower ends welded to the arms 70 and 78, respectively, as best illustrated in Figs. 1 and 5. The pairs of bars 79—80 and 81—82 are arranged so that the vertices 83 formed by juncture of the side flanges 84 and 85 thereof are directed rearwardly of the direction of movement of the rotary element so as to divide the mass of material carried in rotation or circumvolution about the axis of the cylinder upon operation of the dasher 40 (see Fig. 6).

The flanges 84 and 85 of the respective bars thus form substantially V shaped air pockets or channels 86 extending substantially the full length of the freezing cylinder for the entrance of air to the body of the mix which is squeezed between the spaces 87 at the sides of the bars as later described.

The fixed spider 77 includes a ring 88 of suitable diameter to be received in the top end of the cylinder and spokes 89 for supporting a central boss 90 in which the socket 76 is formed. In order to removably anchor the spider, the band is provided with bayonet notches 91 to engage studs 92 projecting from the wall of the cylinder.

The bottom plate 33 is provided with an outlet opening 93 registering with a similar opening 94 in a plate 95 that is welded to the bottom of the freezer cylinder between the side walls of the spout 18 previously mentioned.

Fixed to the bottom side edges of the plate 95 by screws 96 are guide rails 97 and 98 which cooperate with the plate to form parallel guide grooves 99 and 100 to mount the side edges of a sliding gate 101 arranged to close the opening 94 to permit discharge of frozen material from the freezer cylinder. The gate 101 is yieldingly retained in sealing contact with the lower face of the plate 95 by flat lead springs 102 fixed to the under face of the gate by rivets 103 and having their ends bearing against the lower face of the grooves 99 and 100.

In order to operate the gate 101, it is provided with a forwardly extending tongue 104 which projects beyond the front wall 16 and has its end mounted in a slotted opening 105 formed in an actuating lever 106. The lever 106 is best illustrated in Fig. 2 and has one end pivotally mounted on a bracket 107 that is fixed to the lower front wall 16 of the freezer housing. The opposite end of the lever extends parallel with the wall 16 when the gate is closed and is provided with a handle 108 by which the lever may be shifted on its pivotal mounting to slide the gate back and forth across the discharge opening.

The tongue 104 is preferably detachably connected with the lever 106 by a pin 109 which is slidably mounted in a bore 110 formed in a boss 111 on the upper face of the lever. The pin is provided with a head 112 which is normally retained in an opening 113 in the tongue by means of a coil spring 114 having one end bearing against the bottom of the boss and its opposite end against the head 112. The pin 109 is provided with a threaded extension 15 on which is mounted a knob 116 for lifting the head 112 from engagement with the tongue 104 so that the lever may be swung outwardly and the entire gate removed from the guides for cleansing purposes. When the gate is replaced, the knob 116 is raised to permit the tongue 104 to enter the slot 105, after which the knob is released to permit the spring to move the head into engagement with the opening 113 formed in the tongue.

In order to provide a refrigerant for freezing the mix in the freezer cylinder, the cylinder is provided with a cylindrical jacket 117 spaced from the outer face of the freezer cylinder to provide an annular expansion chamber 118 therebetween. The ends of the jacket 117 are curved inwardly and welded to the freezer cylinder as indicated at 119 to close the ends of the expansion chamber. The jacket is provided adjacent its upper end with an inlet connection 120 and an outlet 121 by which the refrigerant may be admitted to the expansion chamber and returned to the refrigerating machine (not shown). The inlet connection may be controlled by any suitable expansion valve as indicated at 122. However, the specific valves and piping arrangement form no part of the present invention.

In operating a freezer constructed and assembled as described, the gate 101 is moved to closed position by operating the lever 106. The cover 40 is then swung backwardly on its pivot and the mixture to be frozen is poured into the freezer cylinder up to a certain level allowing for sufficient swell of the mixture without its overflowing from the top of the cylinder. The refrigerant is then admitted to the expansion chamber to reduce the temperature of the mix, after which the motor is started to actuate the rotary element of the dasher to move the mix circumferentially about the axis of the cylinder, the scraper blades serving as propellers to move the mass through the spaces 87 between the vertical V shaped bars 79—80 and 81—82.

During planetation of the scraper blades the bars are retained in fixed position due to the centering spider 77 so that the mix upon engagement with the vertices of the bars is divided and pushed through the spaces 87 to form separate streams which are again united after passing the bars so that air admitted through the V shaped air channels is trapped directly between the streams before they are united. When the streams are reunited, the air becomes locked in the mix and is gently folded into the freezing mixture without whipping as is the case of present freezing methods where high dasher speed is required in order that the air may be incorporated before the mixture becomes frozen. Thus by gently folding the air into the mix all tendency of buttering and separation of the fat is eliminated.

The folding in of the air into the finished product continues until the desired amount of swell or overrun has been produced and the result is a fine bodied mixture of material having the air cells completely blended into a homogeneous mass of fine quality ice cream.

What I claim and desire to secure by Letters Patent is:

1. In a device of the character described, a cylindrical container for a mixture to be agitated, a driving shaft rotatably mounted in the axis of the container, a dasher head fixed to the driving shaft, a complementary dasher head, means for rotatably mounting the last named head at the upper end of the container in axial alignment with the driving shaft, scraper blades pivotally supported between the heads and arranged to propel the mixture in circumvolution around the wall of the container, a mixture dividing member, means for supporting the divider member in fixed relation to the container, and means on the dividing member having channels for admission of air to the mixture as it is divided by the dividing member for effecting the folding of air into the mixture during circumvolution by the scraper blades.

2. In a device of the character described, a cylindrical container for a mixture to be agitated, a driving shaft rotatably mounted in the axis of the container, a dasher head fixed to the driving shaft, a complementary dasher head, means for rotatably mounting the last named head at the upper end of the container in axial alignment with the driving shaft, spirally arranged spaced bars connecting said heads, scraper blades pivotally supported between the heads and arranged to propel the mixture in circumvolution around the wall of the container, a mixture dividing member, means for supporting the divider member in fixed relation in the container, and means on the dividing member having channels for admission of air to the mixture as it is divided by the dividing member for effecting the folding of air into the mixture during circumvolution by the scraper blades.

3. In a device of the character described, a cylindrical container for a mixture to be agitated, a driving shaft rotatably mounted in the axis of the container, a dasher head fixed to the driving shaft, a complementary dasher head, means for rotatably mounting the last named head at the upper end of the container in axial alignment with the driving shaft, spirally arranged spaced bars connecting said heads, scraper blades pivotally supported between the heads and arranged to propel the mixture in circumvolution around the wall of the container, a mixture dividing member, means for supporting the divider member in fixed relation in the container so that the scraper blades are planetated about the divider member, and means on the dividing member having channels for admission of air to the mixture as it is divided by the dividing member for folding the air into the mixture during circumvolution thereof by the scraper blades.

4. In a device of the character described, a cylindrical container for a mixture to be agitated, a driving shaft rotatably mounted in the axis of the cylinder, a dasher head fixed to the driving shaft, a complementary dasher head, means for rotatably mounting the last named head at the upper end of the container in axial alignment with the driving shaft, spirally arranged spaced bars connecting said heads, scraper blades pivotally supported between the heads and arranged to propel the mixture in circumvolution around the wall of the container, a mixture dividing member, means for supporting the divider member in fixed relation in the container so that the scraper blades are planetated about the divider member, and vertical V shaped bars on the divider member arranged to form vertical channels for admission of air to the mixture as it is circumvolved by the scraper blades.

ALBERT E. SCHNEIDER.